(12) United States Patent
Giovanni

(10) Patent No.: US 7,146,842 B2
(45) Date of Patent: Dec. 12, 2006

(54) SYSTEM FOR PREDETERMINING THE OPERATING THRESHOLD OF A DEVICE SURVEYING THE RADIAL DEFORMATION STATE OF A TIRE

(76) Inventor: Barbanti Giovanni, Via Podgoral., I 40033 Casalecchio di Reno (IT)

( * ) Notice: Subject to any disclaimer, the term of this patent is extended or adjusted under 35 U.S.C. 154(b) by 164 days.

(21) Appl. No.: 10/735,472

(22) Filed: Dec. 12, 2003

(65) Prior Publication Data

US 2005/0166662 A1    Aug. 4, 2005

(51) Int. Cl.
*G01L 27/00* (2006.01)
(52) U.S. Cl. ...................................................... 73/1.57
(58) Field of Classification Search .................. 73/1.57, 73/146.2, 146.8
See application file for complete search history.

(56) References Cited

FOREIGN PATENT DOCUMENTS

WO      WO 99/61264     * 12/1999

* cited by examiner

*Primary Examiner*—Hezron Williams
(74) *Attorney, Agent, or Firm*—Greg Revera; Bradley Arant Rose & White LLP

(57) ABSTRACT

A system for predetermining the operating threshold of a device surveying the radial deformation state of a tire comprises means capable of regulating the push due to the pressure of the tire on a closing mechanism and members capable of regulating the equilibrating counter push of the thrust of Belleville washers, helical springs and axially compressed seals.

3 Claims, 4 Drawing Sheets

SYSTEM FOR PREDETERMINING THE OPERATING THRESHOLD OF A DEVICE SURVEYING THE RADIAL DEFORMATION STATE OF A TIRE

BACKGROUND OF THE INVENTION

The present invention relates to a system for predetermining the operating threshold of a device, which surveys the radial state of deformation of a tire. In particular, the invention discloses an industrialised embodiment, suitable for mass production of the system presenting also particular solutions for predetermining the operating and signalling threshold.

PRIOR ART

EP-A 0 893 284, the owner of which is the applicant, discloses a surveying device, in which a sensor is capable of identifying the difference of pressure between the pressure of the gas inside the tire and the environmental pressure and of out signalling when this difference in pressure is lower than a pre-established threshold value. This device is not used for automatic low cost mass production, presenting a system for the predetermination of the operating threshold, which is not so efficient for mass production. In the Prior Art documents now available safety systems for the identification of the leaks through internal sealing members of the device capable of meeting any requirement are not provided.

AIMS AND FEATURES OF THE INVENTION

The purpose of the present invention is to remedy these defects. The invention, as claimed, solves the problem of creating a system for the predetermination of the operating threshold of a device surveying the radial deformation state of a tire. By means of the present invention it is possible to pre-establish the operating threshold for signalling when the radial deformation state of a loaded tire is higher than a pre-established value since the deformation is proportional to the difference between the gas pressure inside the tire and the environment pressure.

Another purpose to the invention is to provide the device with systems capable of sensing the leak through internal sealing members and protecting the system by out signalling the event.

The system according to the present invention comprises a closure member in equilibrium under the force due to the pressure of the tire chamber acting on a side and the force due to the environmental pressure together with the force of springs on the other side, the section of the closure member on which the pressure and springs forces act, determines the pressure value inside the tire chamber capable of upsetting the equilibrium of the forces with a pressure value lower or identical than a pre-established threshold.

The elastic push of the springs determines the pressure value inside the tire chamber capable of upsetting the equilibrium of the forces with a pressure value lower or identical than a pre-established threshold.

A plurality of springs is provided, located in series and/or in parallel to define the full elastic force co-operating to the equilibrium of the forces acting on the closure member.

The used springs are Belleville washers.

A first Belleville washer rests its external perimeter on the external part of a plate and its internal perimeter on the internal part of the plate, when the system is loaded.

The other springs of the plurality push on the first one.

A side of the chamber is delimited by the envelope, the wall distal from the tire, a first gasket, the group comprising a movable closure member, a diaphragm, a guiding plate and a second gasket, while the other side is delimited by the diaphragm and the closure member integral with each others; when the system is loaded, the end of the housing of the group opens the closure member of a tire inflating valve, therefore, the tire pressure acts in said chamber coming through the chamber, the axial canalisation; a first gasket and a second gasket are used to prevent the connection between the chamber and the chamber.

A chamber is delimited by the threaded end of the tube of the tire inflating valve, by a gasket located between said end and the upper wall of the threaded body, by the end of the housing of the group and by the gasket.

A chamber is delimited by the diaphragm, the closure member and the gasket, the chamber communicating with the atmosphere through a hole, a chamber, the passage, the chamber and the chamber at environmental pressure.

A spring is further provided acting on the closure member with a pre-load defined during the montage of the system.

The spring is pre-loaded by an adjusting screw during the adjusting phase after the montage.

A cylindrical self-closing closure member housed in the hole is pushed by the spring against the gasket, to define sealing and separate the chamber from the chamber when the closure member is unloaded.

A passage connects the downwards portion of the gasket with respect to the chamber to the chamber, communicating with the atmosphere through passages in series with environmental pressure causing adjusted pressure losses; in case that the gasket leaks, the gas of the chamber reaches the atmosphere since it is subject to the pressure losses, therefore, the pressure in the chamber reaches a value higher than the atmospheric one; the pressure difference increases with the value of the loss until the equilibrium of the forces acting on the closure member upsets, the equilibrium being due to the increase of the pressure in the chamber.

BRIEF DESCRIPTION OF THE DRAWINGS

Other advantages, features and aims of the invention, may be more readily understood by referring to the accompanying drawings, which concern preferred embodiments, in which.

DESCRIPTION OF A PREFERRED EMBODIMENT OF THE INVENTION

Figure 1:
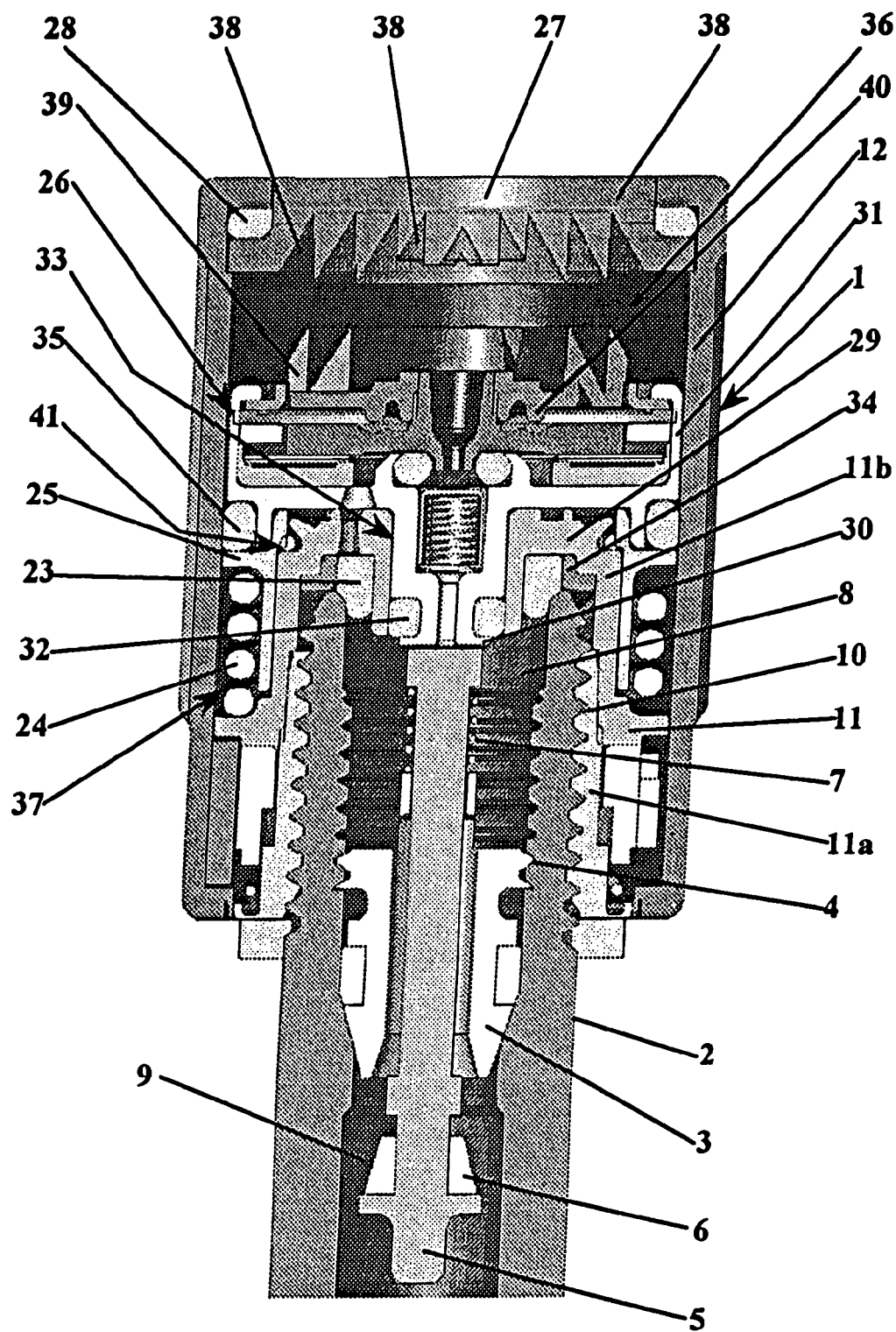
FIG. 1 represents an axial section of a device according to the present invention in loading condition.

FIG. 1 represents a device 1 mounted on a normal inflating valve for tires. Said valve substantially consists of a metallic tube 2 containing a body 3 fixed to its internal part through a threaded sealed connection 4 where a self-closing closure member 5 with sealing gasket 6, maintained in closing position by means of a spring 7 can axially slide.

Figure 2:
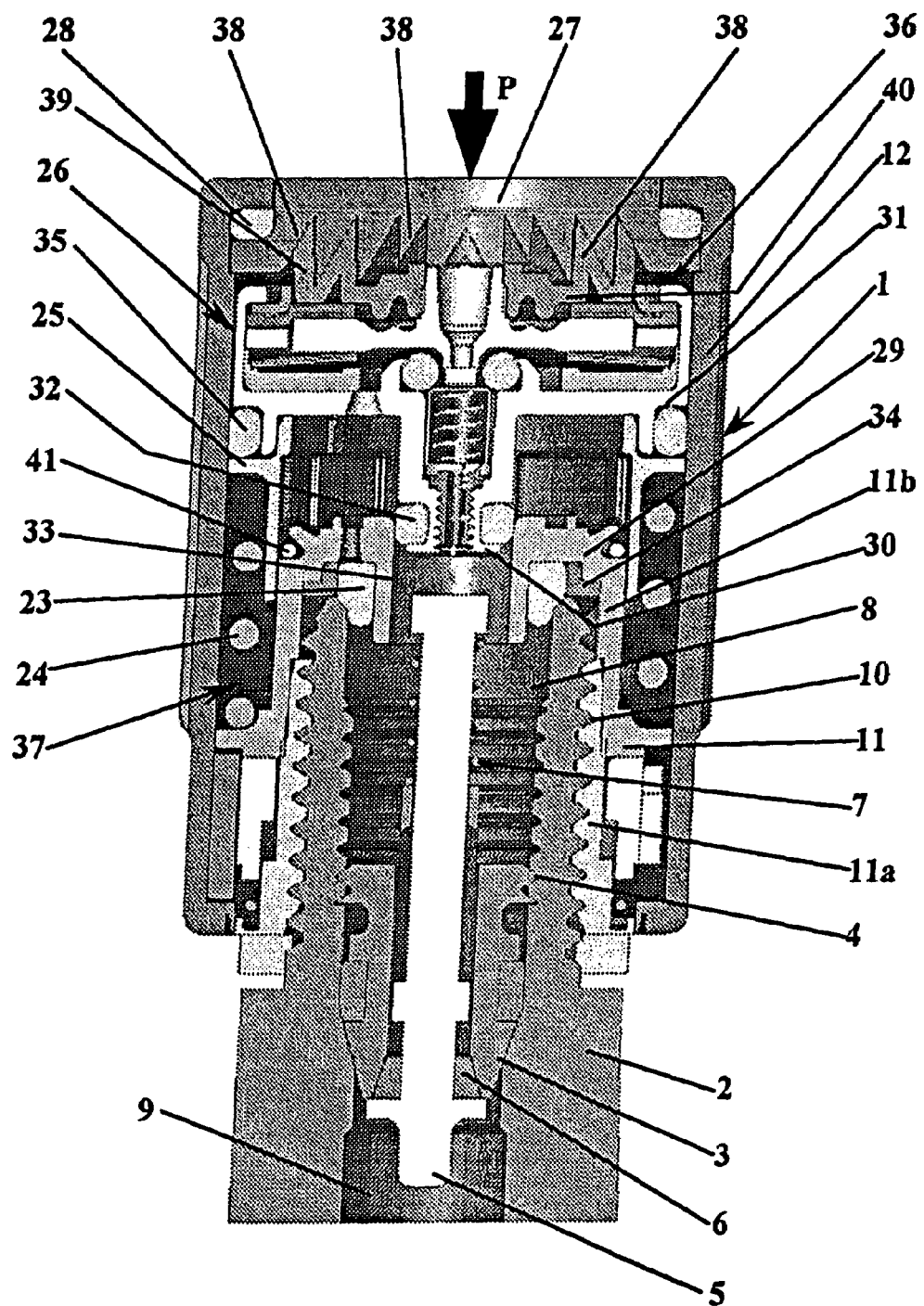
FIG. 2 represents an axial section of a device according to the present invention in unloading condition.

The closure member 5 is capable of automatically opening if the pressure, acting on its part faced toward the external side, that is in the chamber 8, multiplied by the effective surface of the sealing gasket 6, generates an axial downward force higher than the one due to the pressure acting on its part faced toward the internal side, that is in the chamber 9, or inside the tire, multiplied by the effective surface of the sealing gasket 6 together with the additional force of the spring 7 or, vice-versa, of keeping closed if the force due to the pressure in the part faced toward the external side (chamber 8) is lower than the one due to the pressure of the tire (chamber 9) together with the additional force of the spring 7. Of course, the closure member 5 can be opened also by a mechanical action from the external side applying a force to its end going to the internal side as shown in FIG. 2.

The device 1 is screwed on the inflating valve instead of the usual protecting cup. The device 1 and more of its internal members have an axial-symmetrical form. The device 1 comprises a threaded body 11 formed by two parts 11a and 11b welded each other: the threaded body 11 engages the threaded end 10 of the inflating valve of the tire. An external envelope 12 is connected to the threaded body 11 through anti-unscrewing clicks controlling the most applied torque and generating an axial pushing as known from other documents.

Said devices realise an unidirectional free tripper allowing the transmission of the torque between the envelope 12 and the threaded body 11 in the screwing direction only. In said way, when the clamping of all the system is completed and a sufficient tightening torque (capable of contrasting a unscrewing torque) is assured, it is impossible to unscrew the system from the valve since the unscrewing torque applied to the envelope 12 is not transmitted to the threaded body 11.

The clamping is necessary in order to avoid the unscrewing of the system and its losing during the vehicle moving due to external forces and vibrations and also to assure the efficient of the functions the clamping must do.

The clamping of the system on the valve is properly effected when a suitable and not excessive final torque carries it out. Either in case of manual screwing of the system on the end of the inflating valve of the tire, or, above all, in case of use of auxiliary tools for applying a stronger clamping torque, the risk to apply a clamping torque resulting too much strong capable of damaging the system and/or a sealing gasket 23 located between the threaded body 11 and the end 10 of the valve exists.

Anyway, the applying of a too much strong clamping torque is not the only problem: also an insufficient clamping torque results potentially damaging since it makes the presence and the action of the sealing gasket 23 inefficient and it can also cause the unexpected unscrewing, total as well, of the system because of the vibrations due to the vehicle running.

The system is, therefore, capable of assuring, also in case of manoeuvring by a not specialised staff and without suitable tools (and therefore not able to verify if the applied screwing torque has a value that is sufficient for the purpose), the efficient and complete clamping of the threaded members 10, 11 and of the gasket 23.

At the same way, it is suggested to provide a solution that, in addition to assure a complete and efficient clamping of the threaded body on the valve, and consequently capable of informing the operator when a screwing torque having a proper and sufficient value is reached, and then capable of preventing an excessive clamping through screwing torque moments having a value higher than the one expected for the purpose.

In order to get that it is possible to use a kind of system for limiting the torque with respect to the screwing torque applied by the envelope 12 to the threaded body 11 through the above mentioned unidirectional free tripper.

A spring 24 is located between the threaded body 11 and a centring sleeve 25. By means of the sleeve 25 the spring 24 pushes upwards the sensor/amplifier/transducer/actuator system 26 which, before the screwing and clamping manoeuvring of the system 1 on the valve, is found in unloading position (FIG. 2). In said configuration the lower end 30 of the housing 31 of the system 26 does not touch the upper end of the closure member 5, therefore the valve sealing 2 is due to the gasket 6 acting against the body 3.

An axial pushing P applied to the envelope 12 is transmitted by the wall 27 to the sensor/amplifier/transducer/actuator system 26, which, at its turn, compresses the spring 24.

The pushing carried out by the wall 27 on the system 26 causes the translation of said system towards the upper wall 29 of the threaded body 11 up to limit stop. During the descent, the lower end 30 of the housing 31 of the system 26 meets the upper end of the closure member 5 and pushes said member 5 towards the internal part of the valve 2 against the force of the spring 7 and of the pushing of the pressure due to the gas contained in the tire on the efficient section of the gasket 6. By means of said operation the chamber 9, connected to the internal part of the tire, is joined to the chamber 8 delimited by the end 10 of the valve 2, the upper wall 29 of the threaded body 12, the gasket 23 and a gasket 32 capable of sealing the lower end 30 of the housing 31 of the system 26 and the cylindrical hollow 33 obtained on the upper wall 29 of the threaded body 11 (see FIG. 1).

The gasket 6 is open until the system 26 is found near the threaded body 11, while its automatic closing occurs when the system 26 is far from the threaded body 11.

Apparatuses capable of obtaining functions of measuring, amplifying and transducing of the signal due to the difference between the pressure of the gas contained inside the tire and the environmental pressure and of signalling of the exceeding the pre-established threshold.

In this embodiment, said apparatuses are capable of obtaining an efficient pre-establishment of the operating threshold and signalling for differences in pressure between 0,05 and 3 MPa with a definition, precision and reproducibility according to the requirements of using of the tires by means of a limited number of components.

Figure 3:
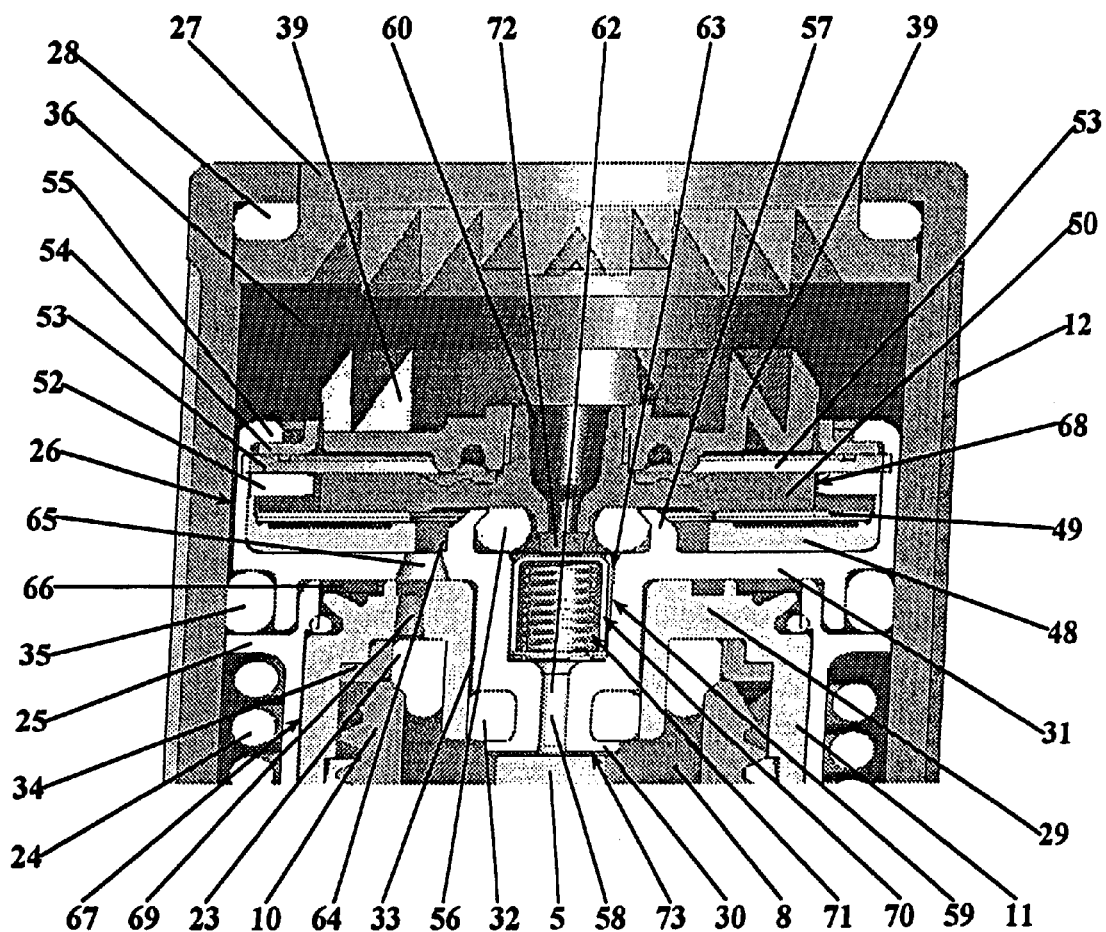
FIG. 3 represents an enlarged partial axial section of a device according to the present invention in loading condition.
Figure 4:
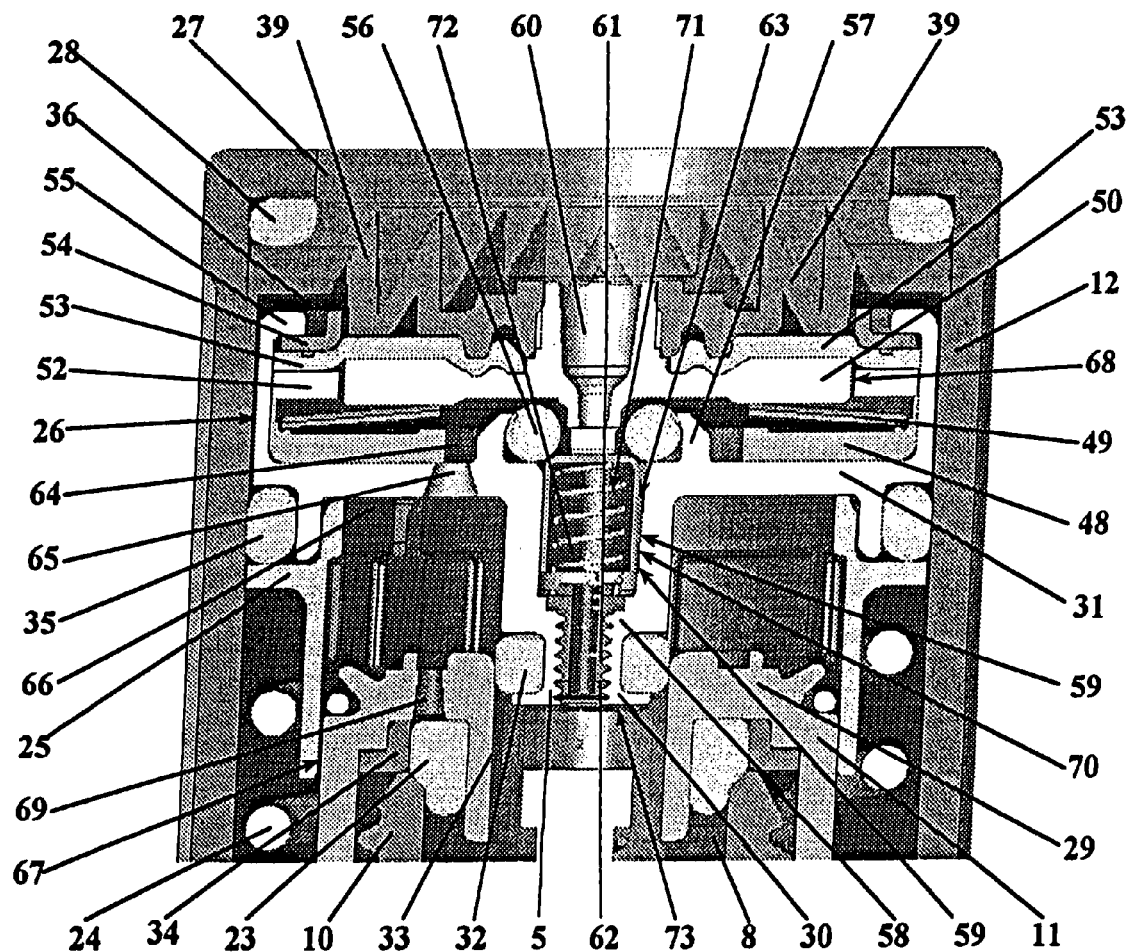
FIG. 4 shows an enlarged partial axial section of a device according to the present invention in unloading condition with adjusting screw.

A shaped plate 48 used for rigidly and plane supporting a plurality of Belleville washers 49 is located inside the housing 31; said washers 49 consisting of shaped like a cone and drilled disks as shown in FIGS. 3, 4.

A movable closure member 50 having a central hub 51 rests on the Belleville washers 49.

The hub 51 is drilled in the middle.

A guiding plate 52 provides the centring of the movable closure member 50, resting on the housing 31 through the plate 48.

A component 39 fixed to the movable closure member 50 and drilled in the middle seals a diaphragm 53 compressing it on the same member 50. The diaphragm presents a central hole where the hub 51 is inserted. The same diaphragm 53 is then sealed on the guiding plate 52 by a sleeve plate 54 clamped by the riveting 55 of the housing 31. The sleeve plate 54 guides the component 39 while this one axially moves together with the movable closure member 50.

A seat in the housing 31 houses a gasket 56, which is hold in its position by a riveting, shaped like a lip 57.

During the loading phase, the pushing P of FIG. 2 is transmitted by the wall 27 to the component 39, which transmits said pushing P to the movable closure member 50; for this reason the member 50 compresses the Belleville washers 49 until the edge of the central hole touches the plate 48. At the same time (FIG. 3), the movable closure member 50 compresses the gasket 56 for the sealing between the member 50 and the housing 31.

This operation produces an axial canalisation 58, 59, 60, which, due to the radial passage 73 on the end 30 of the housing 31, connects the chamber 8 to the chamber 36 and disconnects the chamber 36 from a chamber 64 delimited by the housing 31, the movable closure member 50/diaphragm 53/guiding plate 52 system and by the gasket 56.

The chamber 64 communicates with the environment through a hole 65 drilled in the housing 31, the chamber 66, the passage 67 to the cavity 22 found on the basis of the threaded body 11 and the envelope 12 connected to the environment through a hole drilled in the basis of the threaded body 11.

In FIG. 3 the section 58 of said canalisation consists of an axial hole 62 found at the end 30 of the housing 31. In FIG. 4 the section 58 of said canalisation consists of an axial hole drilled in a screw 61 screwed in a hole 62 found at the end 30 of the housing 31.

The section 59 of said canalisation consists of a hole 63 located in the housing 31 and in series with respect to the hole 62 where the screw 61 is screwed.

The section 60 of said canalisation consists of a hole located inside the hub 51.

In this configuration the end 30 of the housing 31 opens the closure member 5 of the valve 2 so that the pressure of the tire acts in the chambers 8, 36.

The functions of the device are disclosed by EP-A 0 893 284 and, therefore, they are not repeated in the present document. On the contrary, it is of interest to point out the innovative feature of the system consisting of movable closure member 50/diaphragm 53/guiding plate 52 and gasket 56.

The Belleville washers 49 replace, in this case, the bistable lamina of the device as cited in EP-A 0 893 284. The chamber 64 replaces the housing located under the bistable lamina. The chamber 36 substitutes the chamber located over the bistable lamina. The axial canalisation 58, 59, 60 replaces the channels between the chamber communicating with the inside of the tire and the chamber located over the bistable lamina when the device is loaded.

The purpose of the system comprising the Belleville washers 49, the group movable closure member 50/diaphragm 53/guiding plate 52 and gasket 56 is to measure the difference in pressure between the chamber 36 and the environment when the device is loaded, to signal when said difference decreases under a pre-established threshold value and then to define the same threshold value.

The pressure in the chamber 36 acts on the section of the diaphragm 53 on which said pressure operates; said section being delimited by clamping sealing portions with respect to the guiding plate 52 and the movable closure member 50.

The diaphragm 53 generates a frictionless seal between the movable closure member 50 and the guiding plate 52.

Therefore, the force due to the pressure in the chamber 36 acting on the movable closure member 50 is proportional to the surface externally delimited by the dimension of the external contour 68 of the member 50 which mates, with free axial movement, with the centring in the guiding plate 52, and internally delimited by the effective sealing section on the plane perpendicular to the axis of symmetry of the device of the gasket 56, since the pressure in the chamber 36 acts in said effective sealing section of the gasket 56, while the external pressure of the chamber 68 operates inside said sealing section.

The planing of the sections regarding to the surface externally delimited by the dimension of the external contour 68 of the movable closure member 50 and to the effective sealing section of the gasket 56 allows to regulate the force of the pressure in the chamber 36 on the movable closure member 50.

The reactions of the Belleville washers 49 and the gasket 56, compressed by the movable closure member 50, act against said force.

The number and the planing of the Belleville washers 49 and the planing of the gasket 56 define the equilibrium of the movable closure member 50 on which the opposite forces, due to the pressure in the chamber 36 and of the Belleville washers 49 together with the gasket 56, act.

This combination of planing and numbers of components allows to predetermine both the acting threshold and the signalling of the device inside the range from 0,05 to 3 MPa with sufficiently precision.

An annular gasket 35 separates the chamber 36, located between the wall 27 and the system 26, from the chamber 37, found between the centring sleeve 25 and the environment, the chamber 37 communicating with the environment through a hole (not represented) at the basis of the threaded body 11. This gasket 35 co-operates with the spring 24 in order to realise the same function of the bellows of EP-A 0 893 284.

The unscrewing of the system 1 acting on the external envelope 12 is prevented by the free tripper, on condition that the treaded body is clamped by screwing causing a clamping torque the value of which is higher than the torque capable of being transmitted towards the unscrewing, which exists even if rather low. In order to assure a stronger clamping torque, more than the usual friction between the portions, which are connected by the screw thread when both ends of said portions come in contact, it is possible to use further details, as, for example, an elastic washer 34 interposed between the end 10 of the valve 2 and the upper wall 29 of the threaded body 11.

With reference to FIG. 3, an axial hole 69 is provided in the wall 29; said axial hole 69 connecting the downwards portion of the gasket 23, with respect to the chamber 8, with the chamber 64. In case of sealing loss of the gasket 23, the gas tends to come into the chamber 64 acting on the active section of the diaphragm 53 causing an additional pushing with respect to the pushing of the Belleville washers 49 increasing the acting threshold.

Therefore, the signalling of the exceeding of the threshold occurs before the effective pressure in the tire decreases under the predetermined threshold value. So doing it is possible to distinguish the unloading due to the sealing loss of the gasket 23 with respect to the unloading due to a decreasing of the effective pressure in the tire under the predetermined threshold value.

FIG. 3, showing the unloaded device, discloses a safety system to prevent gas-leak from the tire through the device, in case the system 26, after unloading, cannot go up.

When the device is unloaded, but the system 26 in failure does not release the closure member 5 and, therefore, the chamber 8 is still connected to the tire, without the safety system here following disclosed, the gas indefinitely comes out from the chamber 8 until the whole deflation of the tire.

A cylindrical self-closing closure member 70 located in the hole 63 is pushed by the spring 71 against the gasket 56, to define a sealing when the movable closure member 50 is unloading condition. On the contrary, when the movable closure member 50 is loaded, a laminar protuberance 72 extending the hub 51 moves away the cylindrical self-closing closure member 70 from the gasket 56 allowing the connection between the chamber 8 and the chamber 36.

A further regulation of the acting threshold of the device is reached by a screw 61 screwed in the hole 62 of FIG. 4. By means of this screw the pushing of the spring 71 is regulated; said pushing moves the cylindrical self-closing closure member 70 against the gasket 56. Said pushing acts on the laminar protuberance 72 of the movable closure member 50 when this one is loaded, in addition to the pushing of the Belleville washers 49.

The invention claimed is:

1. A system for predetermining the operating threshold of a device surveying the radial deformation state of a tire, comprising:
   a closure member in equilibrium under a first force due to the pressure of a tire chamber acting on a first side of the tire chamber and a second force due to the environmental pressure together with the force of a Belleville washer on a second side of the tire chamber;
   wherein the Belleville washer rests its external perimeter on the external part of a plate and its internal perimeter on the internal part of the plate when the system is loaded; and
   wherein the closure member on which the environmental pressure and the Belleville washer acts, determines the pressure value inside the tire chamber capable of upsetting the equilibrium of the forces with a pressure value inside the tire chamber that is lower or identical to a pre-established threshold.

2. The system of claim 1, wherein the Belleville washer is pre-loaded with a threshold pressure value defined during the mounting of the system.

3. The system of claim 2, wherein the Belleville washer is pre-loaded by use of an adjusting screw.

* * * * *